(12) United States Patent
Kolluru et al.

(10) Patent No.: US 10,091,182 B2
(45) Date of Patent: *Oct. 2, 2018

(54) SYSTEM AND METHOD FOR POOL-BASED IDENTITY AUTHENTICATION FOR SERVICE ACCESS WITHOUT USE OF STORED CREDENTIALS

(71) Applicant: eBay Inc., San Jose, CA (US)

(72) Inventors: Raju Venkata Kolluru, San Jose, CA (US); Michael Dean Kleinpeter, San Francisco, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/815,270

(22) Filed: Nov. 16, 2017

(65) Prior Publication Data

US 2018/0083945 A1 Mar. 22, 2018

Related U.S. Application Data

(63) Continuation of application No. 15/091,712, filed on Apr. 6, 2016, now Pat. No. 9,853,961, which is a continuation of application No. 14/290,823, filed on May 29, 2014, now Pat. No. 9,319,394, which is a continuation of application No. 13/408,611, filed on Feb. 29, 2012, now Pat. No. 8,745,700, which is a continuation of application No. 12/119,684, filed on May 13, 2008, now Pat. No. 8,132,238.

(51) Int. Cl.
*H04L 29/06* (2006.01)
*H04L 9/32* (2006.01)

(52) U.S. Cl.
CPC .............. *H04L 63/08* (2013.01); *H04L 9/321* (2013.01); *H04L 63/0823* (2013.01); *H04L 63/10* (2013.01)

(58) Field of Classification Search
None
See application file for complete search history.

(56) References Cited

U.S. PATENT DOCUMENTS 5,706,427 A 1/1998 Tabuki
5,841,970 A 11/1998 Tabuki
(Continued)

OTHER PUBLICATIONS

Non-Final Office Action received for U.S. Appl. No. 12/119,684, dated Apr. 5, 2011, 8 pages.
(Continued)

*Primary Examiner* — Christopher Revak
(74) *Attorney, Agent, or Firm* — Schwegman Lundberg & Woessner, P.A.

(57) ABSTRACT

A computer-implemented system and method for pool-based identity authentication for service access without use of stored credentials is disclosed. The method in an example embodiment includes providing provisioning information for storage in a provisioning repository; receiving a service request from a service consumer, the service request including requestor identifying information; generating an authentication request to send to an authentication authority, the authentication request including requestor identifying information; receiving validation of an authenticated service request from the authentication authority; and providing the requested service to the service consumer.

20 Claims, 5 Drawing Sheets

(56) References Cited

U.S. PATENT DOCUMENTS

| | | | |
|---|---|---|---|
| 5,987,232 A | 11/1999 | Tabuki | |
| 6,049,877 A | 4/2000 | White | |
| 7,519,596 B2 | 4/2009 | Iyer et al. | |
| 7,562,382 B2 | 7/2009 | Hinton et al. | |
| 7,636,941 B2 | 12/2009 | Blinn et al. | |
| 7,721,322 B2 | 5/2010 | Sastry et al. | |
| 7,870,389 B1 | 1/2011 | Leung et al. | |
| 7,912,971 B1 | 3/2011 | Dunn | |
| 8,132,238 B2* | 3/2012 | Kolluru | H04L 9/321 709/229 |
| 8,291,077 B2 | 10/2012 | I'Anson | |
| 8,447,829 B1 | 5/2013 | Geller et al. | |
| 8,745,700 B2* | 6/2014 | Kolluru | H04L 9/321 709/229 |
| 8,893,242 B2 | 11/2014 | Kolluru et al. | |
| 8,996,482 B1 | 3/2015 | Singh et al. | |
| 9,172,541 B2 | 10/2015 | Kolluru et al. | |
| 9,319,394 B2* | 4/2016 | Kolluru | H04L 63/08 |
| 9,853,961 B2* | 12/2017 | Kolluru | H04L 63/08 |
| 2002/0026427 A1 | 2/2002 | Kon et al. | |
| 2004/0221045 A1 | 11/2004 | Joosten et al. | |
| 2005/0223109 A1 | 10/2005 | Mamou et al. | |
| 2007/0011126 A1 | 1/2007 | Conner et al. | |
| 2007/0271618 A1 | 11/2007 | Chao et al. | |
| 2008/0141339 A1 | 6/2008 | Gomez et al. | |
| 2009/0077618 A1 | 3/2009 | Pearce et al. | |
| 2009/0288149 A1 | 11/2009 | Kolluru et al. | |
| 2012/0159585 A1 | 6/2012 | Kolluru et al. | |
| 2014/0282980 A1 | 9/2014 | Kolluru et al. | |
| 2014/0359746 A1 | 12/2014 | Tezuka et al. | |
| 2016/0226851 A1 | 8/2016 | Koliuru et al. | |

OTHER PUBLICATIONS

Notice of Allowance received for U.S. Appl. No. 12/119,684, dated Oct. 28, 2011, 6 pages.
Response to Non-Final Office Action filed on Aug. 5, 2011, for U.S. Appl. No. 12/119,684, dated Apr. 5, 2011, 10 pages.
Non-Final Office Action received for U.S. Appl. No. 13/408,611, dated Mar. 4, 2013, 10 pages.
Non-Final Office Action received for U.S. Appl. No. 13/408,611, dated Sep. 6, 2013, 5 pages.
Notice of Allowance received for U.S. Appl. No. 13/408,611, dated Jan. 27, 2014, 5 pages.
Response to Non-Final Office Action filed on Jan. 6, 2014, for U.S. Appl. No. 13/408,611, dated Sep. 6, 2013, 8 pages.
Response to Non-Final Office Action filed on Jun. 18, 2013, for U.S. Appl. No. 13/408,611, dated Mar. 4, 2013, 8 pages.
Corrected Notice of Allowability received for U.S. Appl. No. 14/290,823, dated Mar. 24, 2016, 10 pages.
Corrected Notice of Allowability received for U.S. Appl. No. 14/290,823, dated Nov. 20, 2015, 2 pages.
Non-Final Office Action received for U.S. Appl. No. 14/290,823, dated May 21, 2015, 12 pages.
Notice of Allowance received for U.S. Appl. No. 14/290,823, dated Nov. 2, 2015, 6 pages.
Response to Non-Final Office Action filed on Aug. 21, 2015, for U.S. Appl. No. 14/290,823, dated May 21, 2015, 15 pages.
Non-Final Office Action received for U.S. Appl. No. 15/091,712, dated May 12, 2017, 8 pages.
Notice of Allowance received for U.S. Appl. No. 15/091,712, dated Aug. 24, 2017, 3 pages.
Response to Non-Final Office Action filed on Aug. 7, 2017, for U.S. Appl. No. 15/091,712, dated May 12, 2017, 8 pages.
Preliminary Amendment for U.S. Appl. No. 14/290,823, filed Jun. 11, 2014, 5 pages.
Rule 312 Communication for U.S. Appl. No. 14/290,823, filed Jan. 29, 2016, 8 pages.
PTO Response to Rule 312 Communication filed for U.S. Appl. No. 14/290,823, dated Mar. 4, 2016, 2 pages.
Preliminary Amendment for U.S. Appl. No. 15/091,712, filed May 10, 2016, 7 pages.

* cited by examiner

SYSTEM AND METHOD FOR POOL-BASED IDENTITY AUTHENTICATION FOR SERVICE ACCESS WITHOUT USE OF STORED CREDENTIALS

CROSS-REFERENCE TO RELATED APPLICATIONS

This application is a continuation of U.S. patent application Ser. No. 15/091,712 filed Apr. 6, 2016, which is a continuation of U.S. patent application Ser. No. 14/290,823 filed May 29, 2014, now U.S. Pat. No. 9,319,394, which is a continuation of U.S. patent application Ser. No. 13/408,611 filed Feb. 29, 2012, now U.S. Pat. No. 8,745,700, which is a continuation of U.S. patent application Ser. No. 12/119,684 filed May 13, 2008, now U.S. Pat. No. 8,132,238, the benefit of priority of each of which is claimed hereby, and each of which are incorporated by reference herein in their entirety.

BACKGROUND

Copyright Notice

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006-2008, eBay Inc., All Rights Reserved.

Technical Field

This disclosure relates to methods and systems supporting computing and data processing systems. More particularly, pool-based identity authentication for service access without use of stored credentials.

Related Art

In Services Oriented Architecture (SOA), there are many communicating services that are deployed in several machines. In large-scale enterprises, like eBay, eTrade, or Google for example, there could be thousands of different services deployed in thousands of machines. It is most efficient if these services are allowed to communicate with each other. If these services are allowed to communicate with each other, various types of access controls and security checks will be required. These access controls and security checks can include, for example, service authentication, service authorization, and rate limiting. For example, a 'billing service' (caller service) can be authorized to access or call a 'rating calculator service' (callee service), while an 'about me service' will not be so authorized.

For the security checks described above, the callee service needs to be able to identify the caller service. For example, the 'rating calculator service' (callee service) needs to be able to identify the 'billing service' (caller service) prior to enabling access to the callee service. Human users can be easily authenticated by prompting for a password, for example. However, the same mechanisms used for identifying and authenticating human users cannot be used for identifying and authenticating computer-implemented services or software processes or applications. Services and/or applications cannot use password identification/authentication, such as by retrieving a password from disk storage; because, the passwords can be easily stolen and used for unauthorized purposes. In other words, passwords represent an example of undesirable portable credentials that cannot be used safely for identification/authentication of computer-implemented services or software processes or applications. Conventional identification/authentication mechanisms do not support a mechanism for providing identification/authentication of computer-implemented services or software processes or applications without using risky credentials stored on disk.

U.S. Patent Application No. 2005/0223109 describes a system wherein services such as product services, real-time services, and common services are deployed in a services oriented architecture. These services may, for example, be deployed for use in a variety of enterprise data integration functions.

U.S. Patent Application No. 2007/0011126 describes a service-oriented architecture (SOA) and accompanying method. In one embodiment, the SOA includes one or more service requesters coupled to one or more service providers via a bus. The bus includes runtime-binding functionality to facilitate interaction between the one or more service requesters and the one or more service providers. A registry, which stores information pertaining to a service provided by the one or more service providers, communicates with one or more service providers and/or requesters and the bus. In a more specific embodiment, bus includes a Service-Integration Bus (SIB) that includes a Service-Factory (SF) module for facilitating implementing the runtime binding functionality and for selectively invoking the service. Functionality of the SOA is strategically organized into various tiers and layers, including a requester tier, a provider tier, a business-process services tier, an infrastructure-services tier, an SIB layer, a persistence layer, and so on.

Thus, a computer-implemented system and method for pool-based identity authentication for service access without use of stored credentials are needed.

BRIEF DESCRIPTION OF THE DRAWINGS

Embodiments illustrated by way of example and not limitation in the figures of the accompanying drawings, in which.

Figure 1:
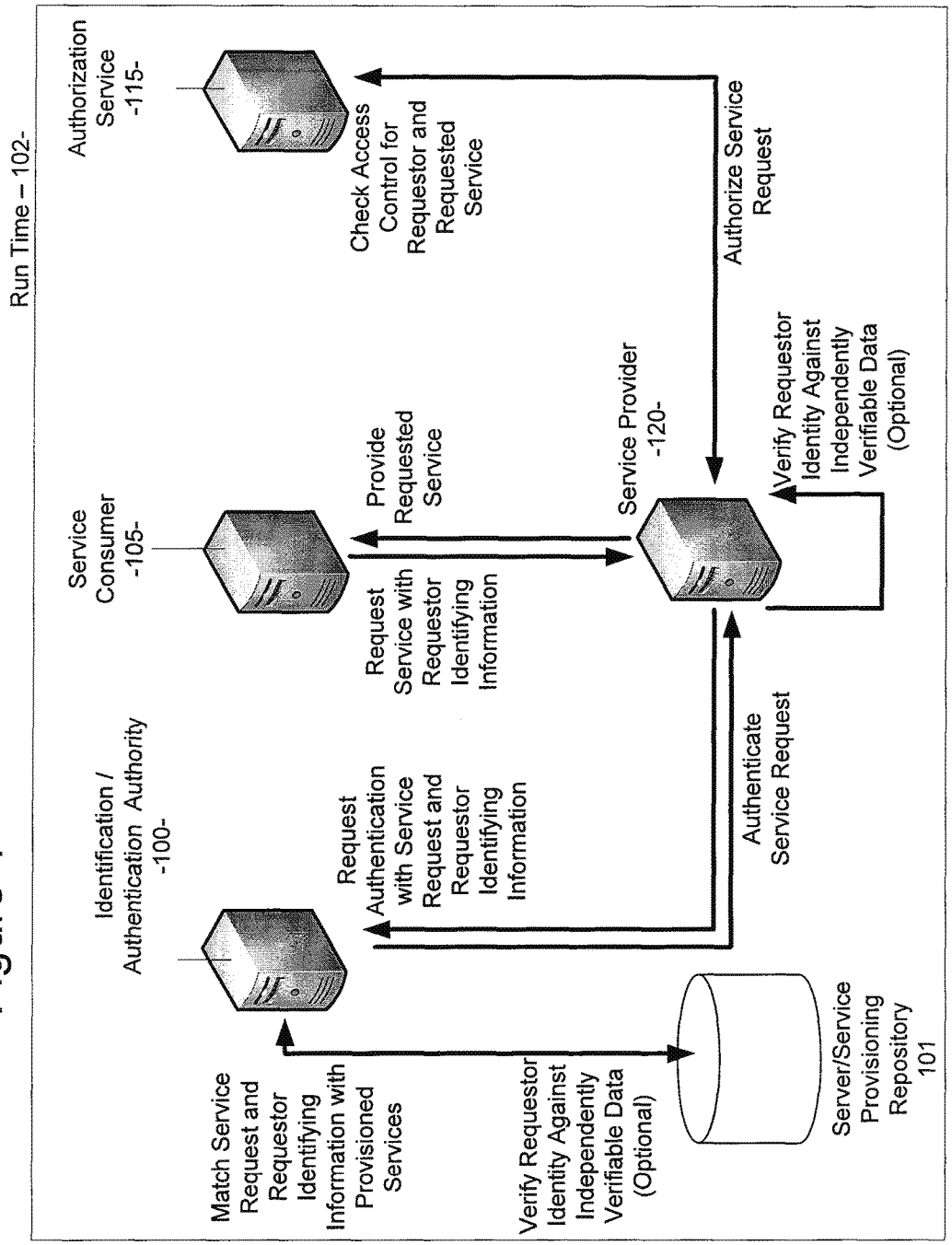
FIG. 1 illustrates an example embodiment of a computer-implemented system for pool-based authentication for service access without use of stored credentials.

DETAILED DESCRIPTION in the following description, for purposes of explanation, numerous specific details are set forth in order to provide a thorough understanding of some example embodiments. It will be evident, however, to one of ordinary skill in the art that the present invention may be practiced without these specific details.

As described further below, according to various example embodiments of the disclosed subject matter described and claimed herein, there is provided a computer-implemented system and method for pool-based identity authentication for service access without use of stored credentials. Various embodiments are described below in connection with the figures provided herein.

In particular embodiments, an identification/authentication authority is provided to compare and match service requests and requester identifying information with provisioned services deployed on target machines. Authentication can be based on the real-time deployment configuration information stored in a provisioning repository in combination with other independently verifiable data and tests performed on the provisioning information and independently verifiable data. As such, in the various embodiments described herein, authentication does not need to be based on a stored credential or certificate. Stored credentials are subject to being compromised and/or illegitimately accessed or used by unauthorized parties. Thus, the various embodiments described herein avoid the use of these risky stored credentials. Without stored credentials, the system of the various embodiments described herein is very flexible. Because there is no key deployment step involved in these various embodiments, the system described herein provides the ability to quickly deploy services or quickly reconfigure a deployment system. "Key deployment" in conventional systems is usually very slow and error-prone. In dynamic deployments, such as grid environments, "key deployment" can become a bottleneck. Further, some conventional computer services/applications prompt a user for the entry of passwords during system startup instead of using stored credentials. However, this is not a scalable solution, as it becomes inefficient when the number of applications exceeds a relatively small threshold. In the various embodiments described herein, the inventive system does not use a stored credential and does not prompt for passwords during start-ups. Hence, the inventive system avoids the use of risky stored credentials and does not need any administrator support to enter passwords during startup.

One example of the independently verifiable data used in various embodiments is an Internet Protocol (IP) address of an application server or a computing system acting as a service consumer. The IP address can be independently verified from the TCP socket header as the raw socket packet structure contains the remote IP address. Additionally, the IP address can be independently verified by extracting the x-Forwarded HTTP (Hypertext Transfer Protocol) value inserted by a virtual IP address forwarding processor. Service requests can be authenticated by the identification/authentication authority server upon successful completion of the tests on the provisioning information and independently verifiable data. The provisioning information stored in the server/service provisioning repository can be trusted given the creation and management of the provisioning information is handled by a secure provisioning system.

Referring to FIG. 1, a diagram illustrates an example embodiment of a computer-implemented system for pool-based authentication for service access without use of stored credentials. During a build time or initial system/service deployment time, a secure provisioning system can be used to create and maintain provisioning information in server/service provisioning repository 101. A secure provisioning/deployment tool, such as OPSWARE or TIVOLI PROVISIONING MANAGER, can be used to perform the initial system/service deployment and generation of the provisioning information stored in the server/service provisioning repository 101. Various embodiments for using this provisioning information to authenticate service requests and service requesters are described in more detail below.

In a particular embodiment, a well-known protocol, such as the security assertion markup language (SAML), can be used for communication among the various components of the system. Conventional SAML is an XML (Extensible Markup Language) standard for exchanging authentication and authorization data between security domains, that is, between a service authenticator (e.g. a producer of assertions) and a service provider (e.g. a consumer of assertions). SAML is a product of the OASIS Security Services Technical Committee. It will be apparent to those of ordinary skill in the art that other protocols may be used with various embodiments.

The single most important problem that SAML is trying to solve is the Web Browser Single Sign-On (SSO) problem. Single sign-on solutions are abundant at the intranet level (using cookies, for example); but, extending these solutions beyond the intranet has been problematic and has led to the proliferation of non-interoperable proprietary technologies. SAML has become a standard underlying many web Single Sign-On solutions in the enterprise identity management problem space. However, SAML does not specify the implementation of local authentication services; indeed, SAML does not care how local authentication services are implemented (although individual service providers most certainly will). A service provider relies on an authentication authority 100 to authenticate the service consumer as will be described in more detail below.

Referring again to FIG. 1, the provisioning information generated by the provisioning system at initial system/service deployment time can be stored in server/service provisioning repository 101 and made accessible to authentication authority 100 in a secure manner. Once this provisioning information is resident in server/service provisioning repository 101, a run time mode 102 can be initiated to enable the service consumers 105 to access and use a plurality of service providers 120 for the particular processing needs of the service consumers 105.

As well known to those of ordinary skill in the art, an authorization service (e.g. a role-based access control system or RBAC server) 115 can be configured to specifically grant or deny access to and/or use of particular services provided by the service providers 120 to particular service consumers 105. In this manner, a properly authenticated service consumer 105 can be granted or denied access to particular services of service providers 120 based on the configured information in authorization service 115. However, the service authorization provided by the authorization service 115 assumes that the authentication/identity of the requesting service consumer has already been verified. This service consumer 105 authentication verification stage is a focus of a particular embodiment as described in more detail below.

Referring still to FIG. 1, once the provisioning information generated by the provisioning system at initial system/service deployment time is stored in server/service provisioning repository 101 and a system run time mode 102 is initiated, each service consumer 105 can thereafter begin to request the use of various services provided by the service providers 120. However, prior to being granted access to the services provided by the service providers 120, the service providers 120 may authenticate the service and service requester identifying information using authentication authority 100. The authentication authority 100 is a processing entity that is trusted by the service providers 120. As such, a service consumer 105 validated by the authentication authority 100 can obtain access to or use of a requested service, assuming such service access or use is authorized by the authorization service 115. Therefore, in a particular embodiment, service consumers 105 do not need to directly access the authentication authority 100 or the authorization service 115 prior to requesting a service from a service provider 120.

During a system run time mode 102, a service consumer 105 can request access to or use of one or more of the services provided by the service providers 120. When a service consumer 105 wishes to use a service of service providers 120, the service consumer 105 makes a request for the service. The service request is a network data transmission that includes identifying information associated with the requesting service consumer 105 as obtained from various sources. For example, the service consumer 105 can supply its IP address or other identifying information that can be independently verified as described above. The service request can also include a name, code, or identifier of the service being requested. The service request with requestor identifying information can be conveyed to the particular service provider 120 as shown in FIG. 1. A SAML communication can be used for this service request.

When the service provider 120 receives a request for service with requestor identifying information from a service consumer 105, the service provider 120 can respond in various ways. First, the service provider 120 can check the requested service and requestor identity and immediately grant access to the requested service if the requested service has been configured with no authentication or authorization restrictions. Secondly and optionally, the service provider 120 can validate the service request and requestor by verifying the content of the service request against independently verifiable data. As described above, the independently verifiable data can include an Internet Protocol (IP) address of the service consumer 105. Thus, the service consumer 105 IP address, name, attributes, or other identifying information that was included in the service request can be validated by the service provider 120 once the service provider 120 obtains the independently verifiable data and matches the data with the corresponding data in the service request of the service consumer 105. If the service provider 120 is able to match the independently verifiable data with the corresponding data in the service request of the service consumer 105, the service provider 120 can optionally accept the identity of the service consumer 105.

In another example embodiment used for services configured with some level of authentication restrictions, the service provider 120 can use the authentication authority 100 to validate the authenticity/identity of the service request and requestor. In this embodiment, when the service provider 120 receives a service request from a service consumer 105, the service provider 120 can request authentication of the service request and requestor from the authentication authority 100. Because the service provider 120 trusts the authentication authority 100 to properly validate the identity of the service consumer 105, the service provider 120 may accept the validated identity of the requesting service consumer 105, given such validation from the authentication authority 100.

As shown in FIG. 1, service provider 120 requests authentication of a service request and requestor by sending an authentication request to the authentication authority 100. The authentication request can include the identifier of the requested service and the requestor identifying information as conveyed to the service provider 120 in the service request from the service consumer 105. The authentication authority 100 can receive the authentication request from the service provider 120 and access corresponding provisioning information in the server/service provisioning information repository 101. The corresponding provisioning information in repository 101 can include the requestor identifying information provisioned for the corresponding service consumer 105. For example, the requestor identifying information provisioned for the corresponding service consumer 105 can include the IP address expected for the particular service consumer 105. This provisioned information corresponding to the requesting service consumer 105 can be compared to the requestor identifying information provided to the authentication authority 100 by the service provider 120 in the authentication request. If the service request and requestor identifying information received by the authentication authority 100 from the service consumer 105 via the service provider 120 matches the requestor identifying information provisioned for the corresponding service consumer 105 in the repository 101, the authentication authority 100 can authenticate the service request by sending a service request authentication validation message to the service provider 120. Otherwise, the authentication authority can send a message to the service provider 120 indicating that authentication of the corresponding service request failed.

Optionally, the authentication authority 100 can also validate the service request and requestor by verifying the content of the service request against independently verifiable data. As described above, the independently verifiable data can include an Internet Protocol (IP) address of the service consumer 105. Thus, the service consumer 105 IP address, name, attributes, or other identifying information that was included in the authentication request can be validated by the authentication authority 100 once the authentication authority 100 obtains the independently verifiable data and matches the data with the corresponding data in the authentication request of the service provider 120. If the authentication authority 100 is able to match the independently verifiable data with the corresponding data in the authentication request of the service provider 120, the authentication authority 100 can validate the identity of the service consumer 105.

Referring still to FIG. 1, once the identity of the service consumer 105 is verified/authenticated by the authentication authority 100 and a validation message is sent to the service provider 120 as described above, the service provider 120 may access the authorization service 115 to check the access controls previously configured for the service consumer 105 with regard to the requested service. If the requesting service consumer 105 is authorized to access or use the requested service as determined using the authorization service 115, the service provider 120 can grant access or use of the requested service to the requesting service consumer 105. Thereafter, the requested service and related data is provided to the requesting service consumer 105. Using a similar process as described above, the service consumer 105 can access and/or use any of the authorized services provided by the service providers 120. In each request for service, the service consumer 105 does not need to access the authentication authority 100 directly to validate the identity of the service consumer 105. Rather, because of the novel configuration and processing of a particular embodiment, the service providers 120 can trust the authentication authority 100 to validate the identity of the service consumers 105 using provisioning information. Further, the authentication authority 100 can trust the provisioning system to generate valid provisioning information for the service consumers 105 as stored in repository 101.

Figure 2:
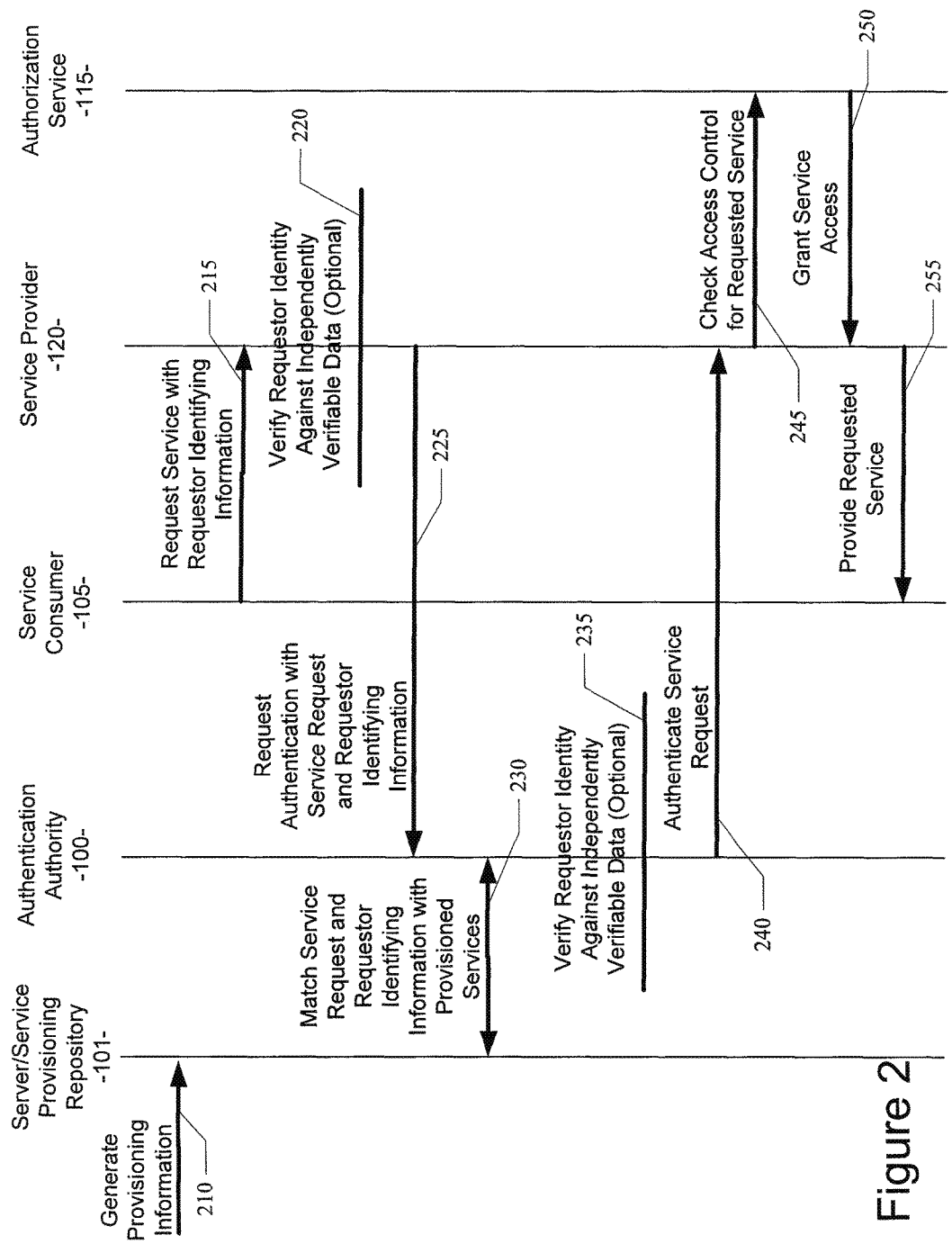
FIG. 2 is an event diagram showing a sequence of operations in one example embodiment.

FIG. 2 is an event diagram showing a sequence of operations in one example embodiment. In a first operation 210 of the example embodiment shown in FIG. 2, the provisioning system generates provisioning information and stores the provisioning information in the server/service provisioning repository 101. This operation typically occurs at initial system/service deployment time. In the next operation 215 of the example embodiment, the service consumer 105 can request one or more services from a service provider 120 in operations performed during system run time 102. In this operation, the service consumer 105 generates a service request including an identifier of a desired service and information identifying the service requestor (i.e. the requesting service consumer 105). In the next optional operation 220 of the example embodiment, the service provider 120 can optionally validate the service request and requestor by verifying the content of the service request against independently verifiable data. As described above, the independently verifiable data can include an Internet Protocol (IP) address of the service consumer 105. Thus, the service consumer 105 IP address, name, attributes, or other identifying information that was included in the service request can be validated by the service provider 120 once the service provider 120 obtains the independently verifiable data and matches the data with the corresponding data in the service request of the service consumer 105. If the service provider 120 is able to match the independently verifiable data with the corresponding data in the service request of the service consumer 105, the service provider 120 can optionally accept the identity of the service consumer 105.

In the next operation 225 of the example embodiment, the service provider 120 can send an authentication request to the authentication authority 100. The service provider 120 uses the authentication authority 100 to validate the authentication of the service request and requestor. In this embodiment, when the service provider 120 receives a service request from a service consumer 105, the service provider 120 can request authentication of the service request and requestor from the authentication authority 100. Because the service provider 120 trusts the authentication authority 100 to properly validate the identity of the service consumer 105, the service provider 120 may accept the validated identity of the requesting service consumer 105, given such validation received from the authentication authority 100.

In the next operation 230 of the example embodiment, the authentication authority 100 can receive the authentication request from the service provider 120 and access corresponding provisioning information in the server/service provisioning information repository 101. The corresponding provisioning information in repository 101 can include the requestor identifying information provisioned for the corresponding service consumer 105. For example, the requestor identifying information provisioned for the corresponding service consumer 105 can include the IP address expected for the service consumer 105. This provisioned information corresponding to the requesting service consumer 105 can be compared to the requestor identifying information provided to the authentication authority 100 by the service provider 120 in the authentication request. If the service request and requestor identifying information received by the authentication authority 100 from the service consumer 105 via the service provider 120 matches the requestor identifying information provisioned for the corresponding service consumer 105 in the repository 101, the authentication authority 100 can authenticate the service request by sending a service request authentication validation message to the service provider 120 in operation 240 shown in FIG. 2. Otherwise, the authentication authority can send a message to the service provider 120 indicating that authentication of the corresponding service request failed.

Optionally, in operation 235 of a particular embodiment, the authentication authority 100 can also validate the service request and requestor by verifying the content of the service request against independently verifiable data. As described above, the independently verifiable data can include an Internet Protocol (IP) address of the service consumer 105. Thus, the service consumer 105 IP address, name, attributes, or other identifying information that was included in the authentication request can be validated by the authentication authority 100 once the authentication authority 100 obtains the independently verifiable data and matches the data with the corresponding data in the authentication request of the service provider 120. If the authentication authority 100 is able to match the independently verifiable data with the corresponding data in the authentication request of the service provider 120, the authentication authority 100 can validate the identity of the service consumer 105.

Referring still to FIG. 2, once the identity of the service consumer 105 is verified/authenticated by the authentication authority 100 and a validation message is communicated to the service provider 120 as described above, the service provider 120 may access the authorization service 115 to check the access controls previously configured for the service consumer 105 with regard to the requested service. If the requesting service consumer 105 is authorized to access or use the requested service as determined using the authorization service 115, the authorization service 115 can grant service access to the service provider 120 in operation 250. Finally in operation 255, the service provider 120 can grant access or use of the requested service to the requesting service consumer 105. Thereafter, the requested service and related data is provided to the requesting service consumer 105. Using a similar process as described above, the service consumer 105 can access and/or use any of the authorized services provided by the service providers 120. In each request for service, the service consumer 105 does not need to access the authentication authority 100 directly to validate the identity of the service consumer 105. Rather, because of the novel configuration and processing of a particular embodiment, the service providers 120 can trust the authentication authority 100 to validate the identity of the service consumers 105. Further, the authentication authority 100 can trust the provisioning system to generate valid provisioning information for the service consumers 105 as stored in repository 101.

Figure 3:
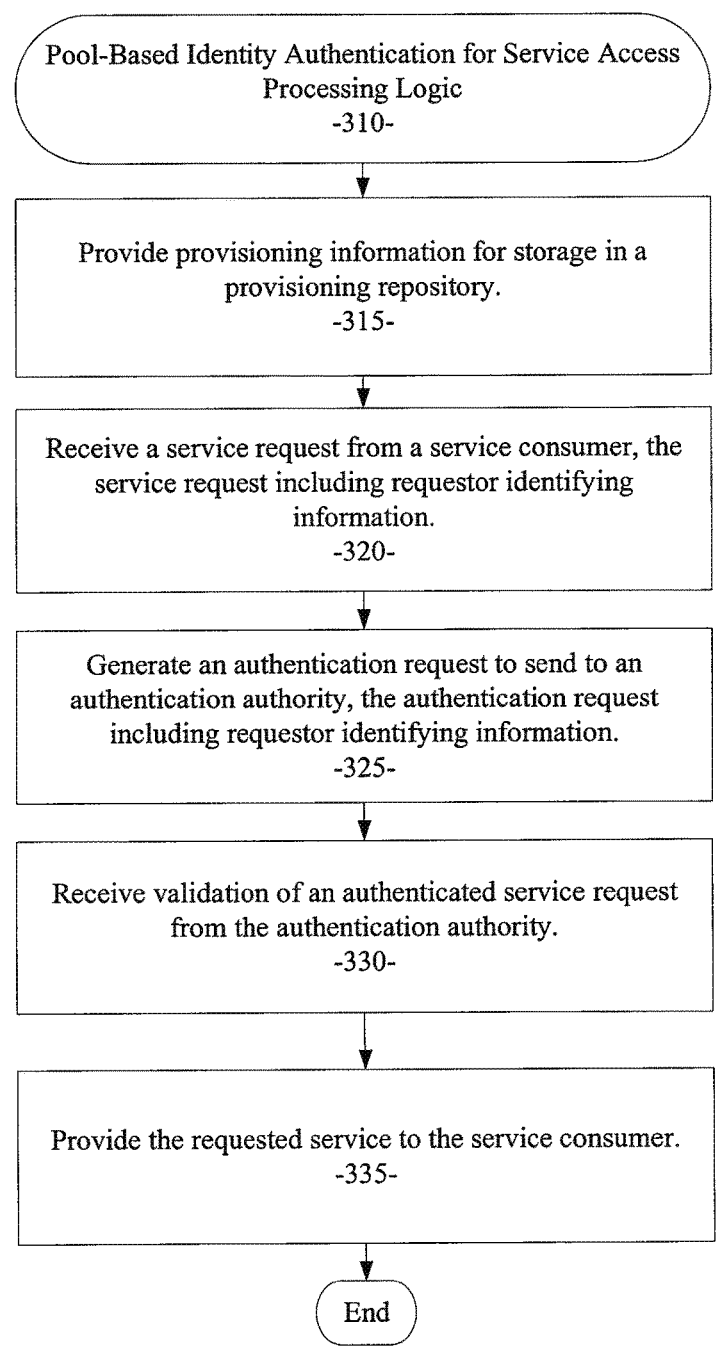
FIGS. 3-4 illustrate processing flow diagrams for various example embodiments.

FIG. 3 illustrates a processing flow diagram for an example embodiment. In the embodiment 310 shown, a pool-based identity authentication apparatus for service access performs the steps of: providing provisioning information for storage in a provisioning repository (processing block 315); receiving a service request from a service consumer, the service request including requestor identifying information (processing block 320); generating an authentication request to send to an authentication authority, the authentication request including requestor identifying information (processing block 325); receiving validation of an authenticated service request from the authentication authority (processing block 330); and providing the requested service to the service consumer (processing block 335).

Figure 4:
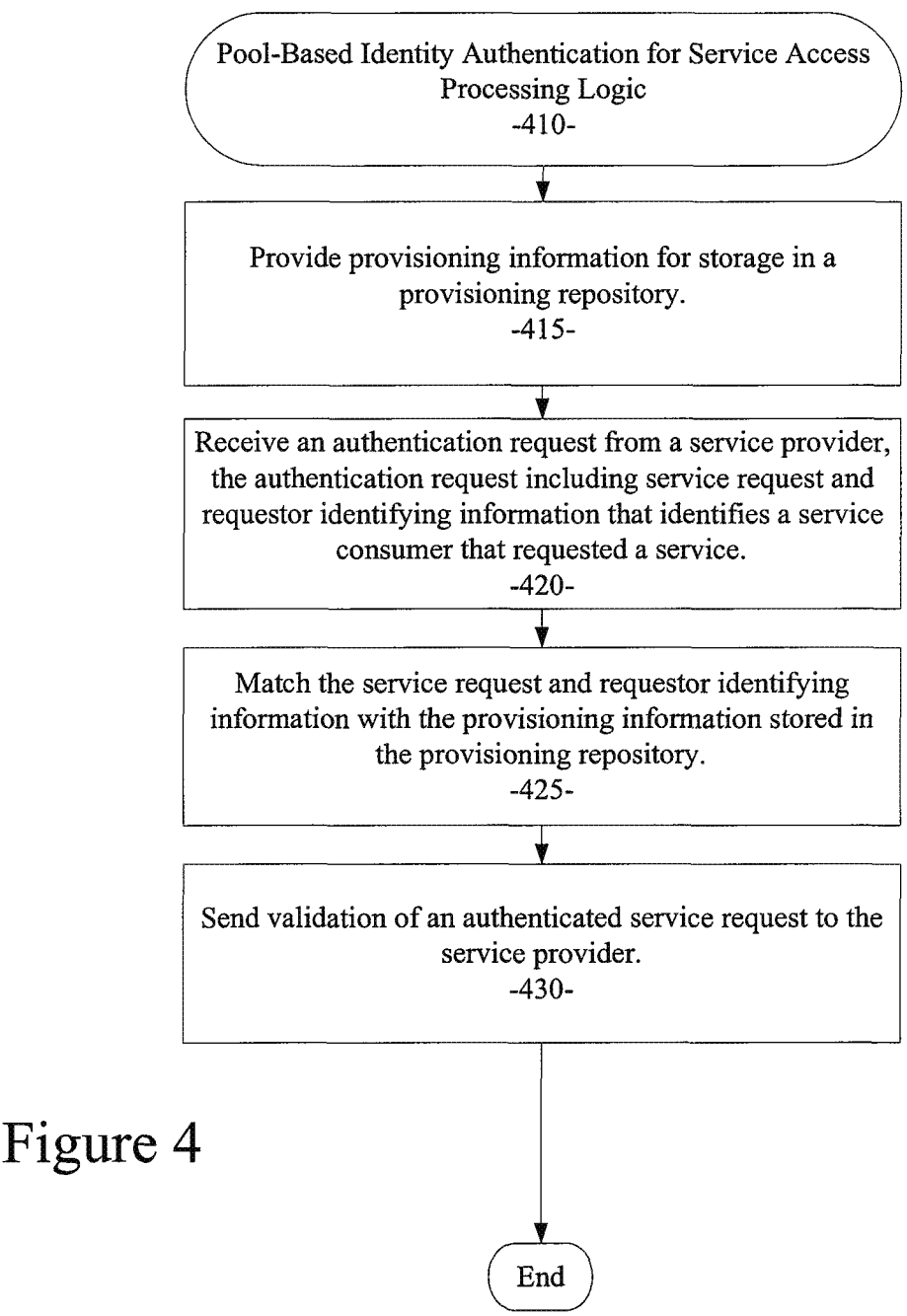

FIG. 4 illustrates a processing flow diagram for another example embodiment. In the embodiment 410 shown, a pool-based identity authentication apparatus for service access performs the steps of: providing provisioning information for storage in a provisioning repository (processing block 415); receiving an authentication request from a service provider, the authentication request including service request and requestor identifying information that identifies a service consumer that requested a service (processing block 420); matching the service request and requestor identifying information with the provisioning information stored in the provisioning repository (processing block 425); and sending validation of an authenticated service request to the service provider (processing block 430).

Figure 5:
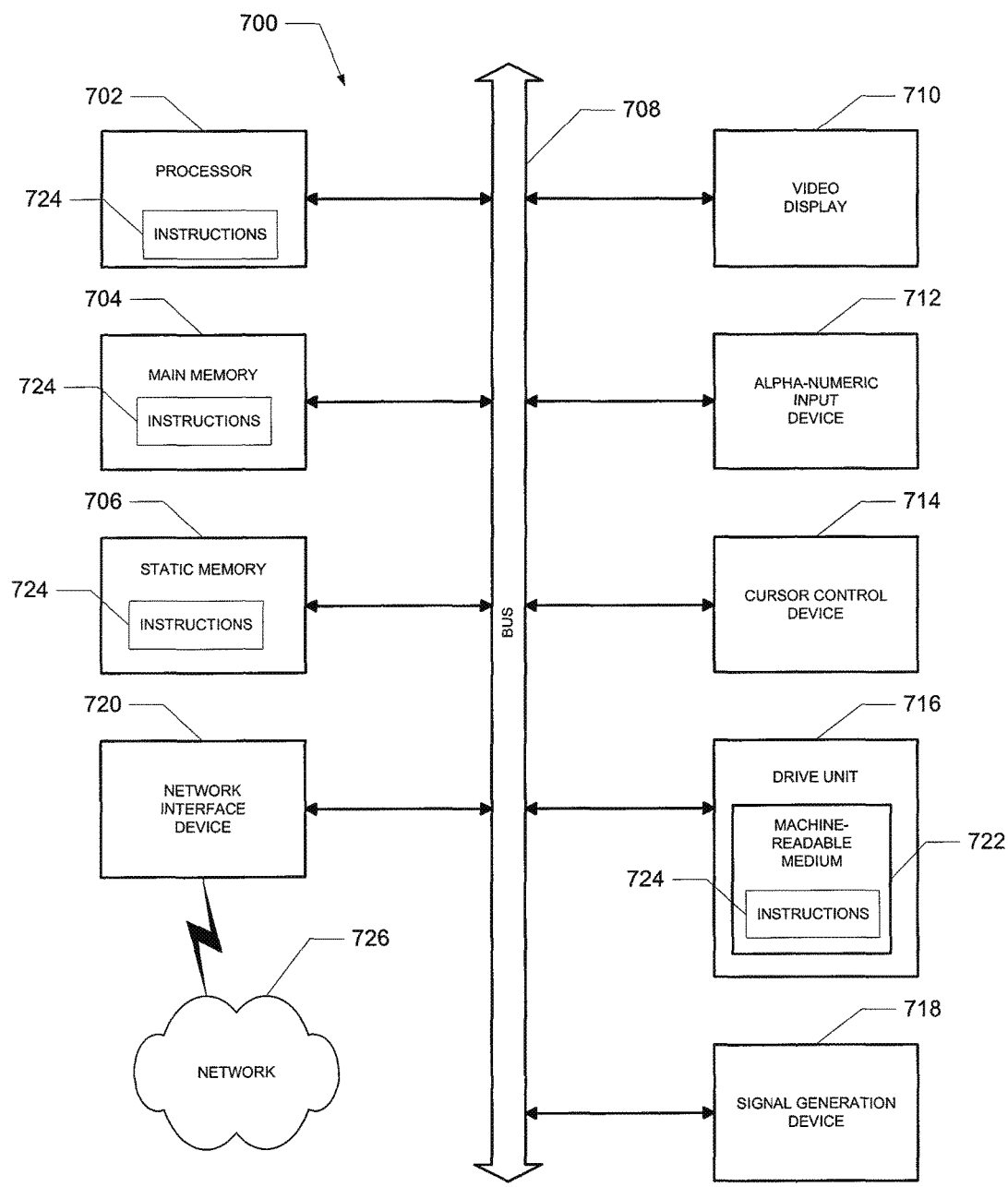
FIG. 5 shows a diagrammatic representation of a machine in the form of a computer system within which a set of instructions, for causing the machine to perform any one or more of the methodologies discussed herein, may be executed, according to an example embodiment.

FIG. 5 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708, The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media, The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals. As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, a computer-implemented system and method for pool-based identity authentication for service access without use of stored credentials are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:

1. A method comprising:
   receiving, by a service provider from a service consumer, a service request representing a request to access a service;
   verifying, by the service provider, content of the service request against independently verifiable data corresponding to the service consumer, the independently verifiable data being obtained independently of a service provider providing the requested service;
   authenticating, at the service provider, of the service request by the service provider:
      sending, to an authentication authority, a request to authenticate the service request; and
      receiving, from the authentication authority, a validation response to the request to authenticate the service request; and
   providing, by the service provider, the service to the service consumer based on the verifying the content of the service request and the authenticating of the service request.

2. The method of claim 1, wherein the independently verifiable data includes an IP address of the service consumer.

3. The method of claim 1, further comprising:
   prior to authenticating the service provider, determining whether a configuration restriction associated with the service request is not pre-configured for an immediate response to grant access to the service consumer for the service request without authentication.

4. The method of claim 1, wherein the service provider and the service consumer represent services deployed within a services oriented architecture (SOA).

5. The method of claim 1, further comprising:
   storing provisioning information for the service in a service provisioning repository during deployment of the service in the multiple machines; and
   wherein the authentication authority validates the request based on the provisioning information.

6. The method of claim 5, further comprising enabling an authentication authority to access the provisioning information stored in the service provisioning repository during run time.

7. The method of claim 5, wherein the authentication authority does not use stored credentials for validating the request.

8. The method of claim 1, wherein the verifying the content of the service request against independently verifiable data corresponding to the service consumer comprises verifying an IP address from a TCP socket header.

9. The method of claim 8, wherein the verifying the IP address from the TCP socket header comprises extracting an x-Forwarded Hypertext Transfer Protocol (HTTP) value inserted by a. virtual IP address forwarding processor.

10. A system comprising:
    a memory device for storing instructions; and
    a processor, which, when executing the instructions, causes the system to perform operations comprising:
       receiving, by a service provider from a service consumer, a service request representing a request to access a service;
       verifying, by the service provider, content of the service request against independently verifiable data corresponding to the service consumer, the independently verifiable data being obtained independently of a service provider providing the requested service;
       authenticating, at the service provider, of the service request by the service provider:
          sending, to an authentication authority, a request to authenticate the service request; and
          receiving, from the authentication authority, a validation response to the request to authenticate the service request; and
       providing, by the service provider, the service to the service consumer based on the verifying the content of the service request and the authenticating of the service request.

11. The system of claim 10, wherein the independently verifiable data includes an IP address of the service consumer.

12. The system of claim 10, wherein the operations further comprise:
    prior to authenticating the service provider, determining whether a configuration restriction associated with the service request is not pre-configured for an immediate response to grant access to the service consumer for the service request without authentication.

13. The system of claim 10, wherein the service provider and the service consumer represent services deployed within a services oriented architecture (SOA).

14. The system of claim 10, wherein the operations further comprise:
    storing provisioning information for the service in a service provisioning repository during deployment of the service in the multiple machines; and
    wherein the authentication authority validates the request based on the provisioning information.

15. The system of claim 14, wherein the operations further comprise enabling an authentication authority to access the provisioning information stored in the service provisioning repository during run time.

16. The system of claim 14, wherein the authentication authority does not use stored credentials for validating the request.

17. The system of claim 10, wherein the verifying the content of the service request against independently verifiable data corresponding to the service consumer comprises verifying an IP address from a TCP socket header.

18. The system of claim 17, wherein the verifying the IP address from the TCP socket header comprises extracting an x-Forwarded Hypertext Transfer Protocol (HTTP) value inserted by a virtual IP address forwarding processor.

19. A computer readable non-transitory storage medium storing at least one program configured for execution by a computer, the at least one program comprising instructions to perform operations comprising:
    receiving, by a service provider from a service consumer, a service request representing a request to access a service;
    verifying, by the service provider, content of the service request against independently verifiable data corresponding to the service consumer, the independently verifiable data being obtained independently of a service provider providing the requested service;
    authenticating, at the service provider, of the service request by the service provider:
       sending, to an authentication authority, a request to authenticate the service request; and
       receiving, from the authentication authority, a validation response to the request to authenticate the service request; and providing, by the service provider, the service to the service consumer based on the verifying the content of the service request and the authenticating of the service request.

20. The computer readable non-transitory storage medium of claim 19, wherein the operations further comprise:
   prior to authenticating the service provider, determining whether a configuration restriction associated with the service request is not pre-configured for an immediate response to grant access to the service consumer for the service request without authentication.

* * * * *